United States Patent
Chikkananjappa et al.

(10) Patent No.: US 12,526,311 B2
(45) Date of Patent: Jan. 13, 2026

(54) METHODS FOR BOT DETECTION USING MACHINE LEARNING MODELS

(71) Applicant: F5, Inc., Seattle, WA (US)

(72) Inventors: Manjunath Suggandahalli Chikkananjappa, Bangalore (IN); Sandeep Pombra, Seattle, WA (US)

(73) Assignee: F5, Inc., Seattle, WA (US)

( * ) Notice: Subject to any disclaimer, the term of this patent is extended or adjusted under 35 U.S.C. 154(b) by 158 days.

(21) Appl. No.: 18/198,491

(22) Filed: May 17, 2023

(65) Prior Publication Data

US 2025/0358314 A1    Nov. 20, 2025

(51) Int. Cl.
  *H04L 9/40*    (2022.01)
  *H04L 41/16*   (2022.01)

(52) U.S. Cl.
  CPC ......... *H04L 63/1483* (2013.01); *H04L 41/16* (2013.01)

(58) Field of Classification Search
  CPC H04L 63/1483; H04L 2463/144; H04L 41/16
  See application file for complete search history.

(56) References Cited

U.S. PATENT DOCUMENTS

| | | | |
|---|---|---|---|
| 8,370,938 B1 | 2/2013 | Daswani | |
| 8,555,391 B1 | 10/2013 | Demir | |
| 8,682,812 B1* | 3/2014 | Ranjan | H04L 43/028 706/12 |
| 8,850,584 B2 | 9/2014 | Alme | |
| 8,893,294 B1 | 11/2014 | Steele, III | |
| 9,210,171 B1 | 12/2015 | Varadarajan | |
| 9,294,442 B1 | 3/2016 | Lian | |
| 9,384,345 B2 | 7/2016 | Dixon | |
| 10,171,495 B1 | 1/2019 | Bowen | |
| 10,270,792 B1* | 4/2019 | Shemesh | H04L 63/1433 |
| 11,138,463 B1* | 10/2021 | Wang | G06N 5/047 |
| 11,245,722 B1* | 2/2022 | Senecal | H04L 63/1425 |
| 11,757,914 B1 | 9/2023 | Jakobsson | |

(Continued)

FOREIGN PATENT DOCUMENTS

| | | |
|---|---|---|
| CN | 103617390 A | 3/2014 |
| WO | 2007027469 A2 | 3/2007 |

OTHER PUBLICATIONS

F5 Networks Inc., "Big-IP Application Security Manager: Gelling Started®", Manual, Nov. 13, 2017, 46 pages, vol. 13.1, F5 Networks, Inc., Retrieved from the Inlernel:<https://lechdocs.f5.com/kb/en-us/producls/big-ip_asm/manuals/producl/asm-getting-started-13-1-0 .html>.

(Continued)

*Primary Examiner* — Nam T Tran
(74) *Attorney, Agent, or Firm* — Troutman Pepper Locke LLP

(57) ABSTRACT

Methods, non-transitory computer readable media, security server devices, and security systems that perform bot detection using machine learning models are illustrated. With this technology, a request for a webpage from a client device to a server device is received. The request has one or more associated logs. A set of features is generated based on the one or more associated logs. The set of features are submitted as an input to a machine learning model. In response to an output of the machine learning model indicating the request for a webpage from the client device was initiated by a bot, the request is denied.

20 Claims, 5 Drawing Sheets

(56) References Cited

U.S. PATENT DOCUMENTS

| | | |
|---|---|---|
| 2002/0147805 A1 | 10/2002 | Leshem |
| 2004/0088570 A1 | 5/2004 | Roberts |
| 2005/0114658 A1 | 5/2005 | Dye |
| 2007/0174915 A1 | 7/2007 | Gribble |
| 2007/0204153 A1 | 8/2007 | Tome et al. |
| 2009/0204638 A1 | 8/2009 | Hollier |
| 2011/0119220 A1 | 5/2011 | Seolas |
| 2011/0214176 A1 | 9/2011 | Burch et al. |
| 2011/0214182 A1 | 9/2011 | Adams |
| 2012/0017274 A1 | 1/2012 | Schrecker |
| 2012/0036580 A1 | 2/2012 | Gorny |
| 2014/0283078 A1 | 9/2014 | Redfoot |
| 2014/0298469 A1 | 10/2014 | Marion |
| 2014/0317754 A1 | 10/2014 | Niemela |
| 2015/0033331 A1 | 1/2015 | Stern |
| 2015/0067848 A1 | 3/2015 | Baikalov |
| 2015/0121529 A1 | 4/2015 | Quinlan |
| 2016/0191554 A1* | 6/2016 | Kaminsky .......... H04L 63/1425 726/23 |
| 2016/0275190 A1 | 9/2016 | Seed |
| 2016/0306974 A1 | 10/2016 | Turgeman |
| 2017/0126709 A1* | 5/2017 | Baradaran .......... H04L 63/1425 |
| 2017/0223052 A1 | 8/2017 | Stutz |
| 2017/0272404 A1 | 9/2017 | Prey et al. |
| 2018/0020024 A1 | 1/2018 | Chao |
| 2018/0167412 A1 | 6/2018 | Barrett |
| 2018/0219910 A1 | 8/2018 | Greenshpan |
| 2018/0241774 A1 | 8/2018 | Zhao |
| 2019/0068640 A1 | 2/2019 | Araujo |
| 2019/0087574 A1 | 3/2019 | Schmidtler |
| 2019/0132291 A1 | 5/2019 | Zhao et al. |
| 2019/0166141 A1 | 5/2019 | Xu et al. |
| 2019/0318081 A1 | 10/2019 | Gupta |
| 2019/0334940 A1 | 10/2019 | Bar Noy |
| 2020/0099714 A1* | 3/2020 | Haridas ............... H04L 63/1425 |
| 2020/0112578 A1* | 4/2020 | Gupta ................ H04L 63/1425 |
| 2020/0153763 A1 | 5/2020 | Baudart |
| 2020/0204589 A1 | 6/2020 | Strogov |
| 2020/0301672 A1* | 9/2020 | Li ........................... G06N 3/08 |
| 2020/0342103 A1 | 10/2020 | Luo |
| 2020/0396233 A1* | 12/2020 | Luo .................... H04L 63/1425 |
| 2021/0058395 A1 | 2/2021 | Jakobsson |
| 2021/0232755 A1 | 7/2021 | Jadhav |
| 2021/0334091 A1 | 10/2021 | Gujarathi |
| 2022/0038481 A1 | 2/2022 | Jones |
| 2022/0191241 A1* | 6/2022 | Vera-Schockner ......................... H04L 63/1416 |
| 2022/0279013 A1 | 9/2022 | Qiu |
| 2024/0259347 A1 | 8/2024 | Grover |
| 2025/0190966 A1 | 6/2025 | Gutierrez-Sheris |

OTHER PUBLICATIONS

F5 Networks Inc., "Assigning Attack Signatures to Security Policies", Manual, 2019, 6 pages, F5 Networks, Inc., Retrieved from the Inlernel:<https://lechdocs.f5.com/kb/en-us/producls/big-ip_asm/manuals/producl/big-ip-asm-attack-and-bol-signatures-14-1-0/01.html#guid-9e8b2b2f-1325-4 715-a879-311 c802b2e97>.

F5 Networks Inc., "Big-IP 15.0.1 New and Installation" Release Noles, 2019, 33 pages, Version 15.0.1, F5 Networks, Inc., Retrieved from the Inlernel:<https://lechdocs.f5.com/kb/en-us/producls/big-ip_llm/releasenoles/producl/relnole-bigip-15-0-1.html>.

Phu H. Phung, David Sands, and Andrey Chudnov; Lightweight self-protecting JavaScript. In Proceedings of the 4th International Symposium on Information, Computer, and Communications Security (ASIACCS '09). Association for Computing Machinery, New York, NY, USA, 47-60 (ACM 2009) (Year: 2009).

Yu, Weider D., Dhanya Aravind, and Passarawarin Supthaweesuk. "Software vulnerability analysis for web services software systems." In 11th IEEE Symposium on Computers and Communications (ISCC'06), pp. 740-748. IEEE, 2006. (Year: 2006).

European Search Report for EP 24176730.0, dated Jul. 17, 2024.

European search report Europe Application No. 24201979.2. Dated Jan. 14, 2025.

European Search Report Dated Jan. 27, 2025. EP Application No. EP 24 20 2454.

Saiedian, Hossein, and Dan Broyle. "Security vulnerabilities in the same-origin policy: Implications and alternatives." Computer 44, No. 9 (2011 ): 29-36. (Year: 2011).

* cited by examiner

| FEATURES | DESCRIPTION |
| --- | --- |
| LOWERCASE_HEADERS | The Lowercase headers |
| IP_HOST | IP in the host |
| HOST_ERROR | IP not in the host |
| CONTENT_ANAMOLY | are Content anomalies |
| FEW_HEADERS | are Low number of headers |
| HEADER_ERROR | is if there is any error in headers |
| NO_CONTENT_POST | "http_method" in ['POST', 'PUT', 'PATCH'] |
| METHODS_ENTROPY | entropy of http_methods |
| USUAL_HEADERS | ['Host', 'Accept', 'User-Agent'] |
| FREQUENT_HEADERS | ['host', 'user-Agent', 'accept-Encoding', 'connection', 'content-Length', 'content-Type', 'cookie', 'via', 'authorization', 'referrer', 'origin', 'accept-Charset', 'accept', 'accept-encoding', 'accept-charset', 'content-length', 'content-type', 'user-agent'] |
| COMMON_METHODS | ['GET', 'POST', 'HEAD', 'PUT'] |
| UNSUAL_METHODS | ['DELETE', 'OPTIONS', 'REGISTER', 'DEBUG', 'PROPFIND', 'PATCH', 'CONNECT', 'SEARCH', 'INDEX'] |
| is_script | files are if url ends with ['php', 'jsp', 'asp', 'aspx', 'cgi', 'pl', 'js'] |
| is_static_file | if url ends with ['html', 'htm', 'txt', 'ini', 'cfm', 'shtml', 'xml', 'log'] |
| is_other_file | if url ends with zip, dll, nsf, gz, rar, mdb |
| USER_AGENT | ["ua_parser_class", "old_ua", "mobile_ua", "user_agent", "operating_system"] all these features are derived from ua_parser lib |

FIG. 4

METHODS FOR BOT DETECTION USING MACHINE LEARNING MODELS

This technology relates to methods and systems for automatically detecting web requests that originate from bots using machine learning models.

BACKGROUND

A bot is software application that runs automated tasks over the Internet, commonly with the intent of mimicking or posing as human behavior. A bot attack is a type of malicious attack that utilizes a series of connected computers to attack a network, device, and/or website. Such attacks commonly have the effect of substantially degrading the target systems and devices. In web applications, bots are ubiquitous and malicious bots are problematic because they can manipulate information, spread misinformation, and promote unverified information, which can adversely affect end users. Thus, bots can present various problems, such as degradation of the performance of systems, information leakage, security threats and negatively impacting the experience of legitimate users of a web service.

Currently, there are many solutions for detecting bots. However, current solutions typically generate a large number of false positives, which result in legitimate users being classified as bots. Detecting bot activity is complex because many bots actively try to avoid detection by actively changing their IP address and user agent. A user agent is a special type of software agent that acts on behalf of a user to retrieve, render and facilitate end-user interaction with web content, such as a web browser or an email reader. Software agents often identify themselves, their application type, operating system, device model, software vendor and/or software revision. For example, in hypertext transfer protocol (HTTP), such identifications are transmitted in the header field User-Agent. However, malicious bots may provide header (or other such) information that is intended to obscure its true nature. As there is a large range of header information values that can be provided by legitimate users and the variations of legitimate values by bots is constantly changing, using a rules-based approach to screening web traffic based on header information is likely to lead to many legitimate users being falsely identified as bots or failure to identify actual bots.

Therefore, it is desirable to create a system for more accurately identifying web requests originating from bots, which can be deployed in near real-time to identify and prevent access to bots while properly identifying and granting access to legitimate users.

SUMMARY

A method implemented by one or more security server devices, server devices or client devices that includes receiving a request for a webpage from a client device to a server device. The request is associated with logs. A set of features is generated based on the one or more associated logs. The method set of features are submitted as an input to a machine learning model. In response to the machine learning model, generating an output that indicates the request for a webpage from the client device was initiated by a bot, the request is denied.

A security server device includes a memory including programmed instructions stored thereon and one or more processors configured to be capable of executing the stored programmed instructions to receive a request for a webpage from a client device to a server device. The request is associated with logs. A set of features is generated based on the one or more associated logs. The method set of features are submitted as an input to a machine learning model. In response to an output of the machine learning model indicating the request for a webpage from the client device was initiated by a bot, the request is denied.

A non-transitory computer readable medium having stored thereon instructions for including executable code that, when executed by one or more processors, causes the processors to receive a request for a webpage from a client device to a server device. The request is associated with logs. A set of features is generated based on the one or more associated logs. The method set of features are submitted as an input to a machine learning model. In response to an output of the machine learning model indicating the request for a webpage from the client device was initiated by a bot, the request is denied.

A security server system, comprising one or more security server devices, server devices, or clients with memory comprising programmed instructions stored thereon, and one or more processors configured to be capable of executing the stored programmed instructions to receive a request for a webpage from a client device to a server device. The request is associated with logs. A set of features is generated based on the one or more associated logs. The method set of features are submitted as an input to a machine learning model. In response to an output of the machine learning model indicating the request for a webpage from the client device was initiated by a bot, the request is denied.

This technology provides a number of advantages including providing methods, non-transitory computer readable media, security server devices, and security server systems that help to control access to configuration data in a multi-admin system.

BRIEF DESCRIPTION OF THE DRAWINGS

FIG. 4 is table of exemplary numerical and categorical features that may be derived by a security server device in accordance with embodiments of the disclosure.

Figure 1:
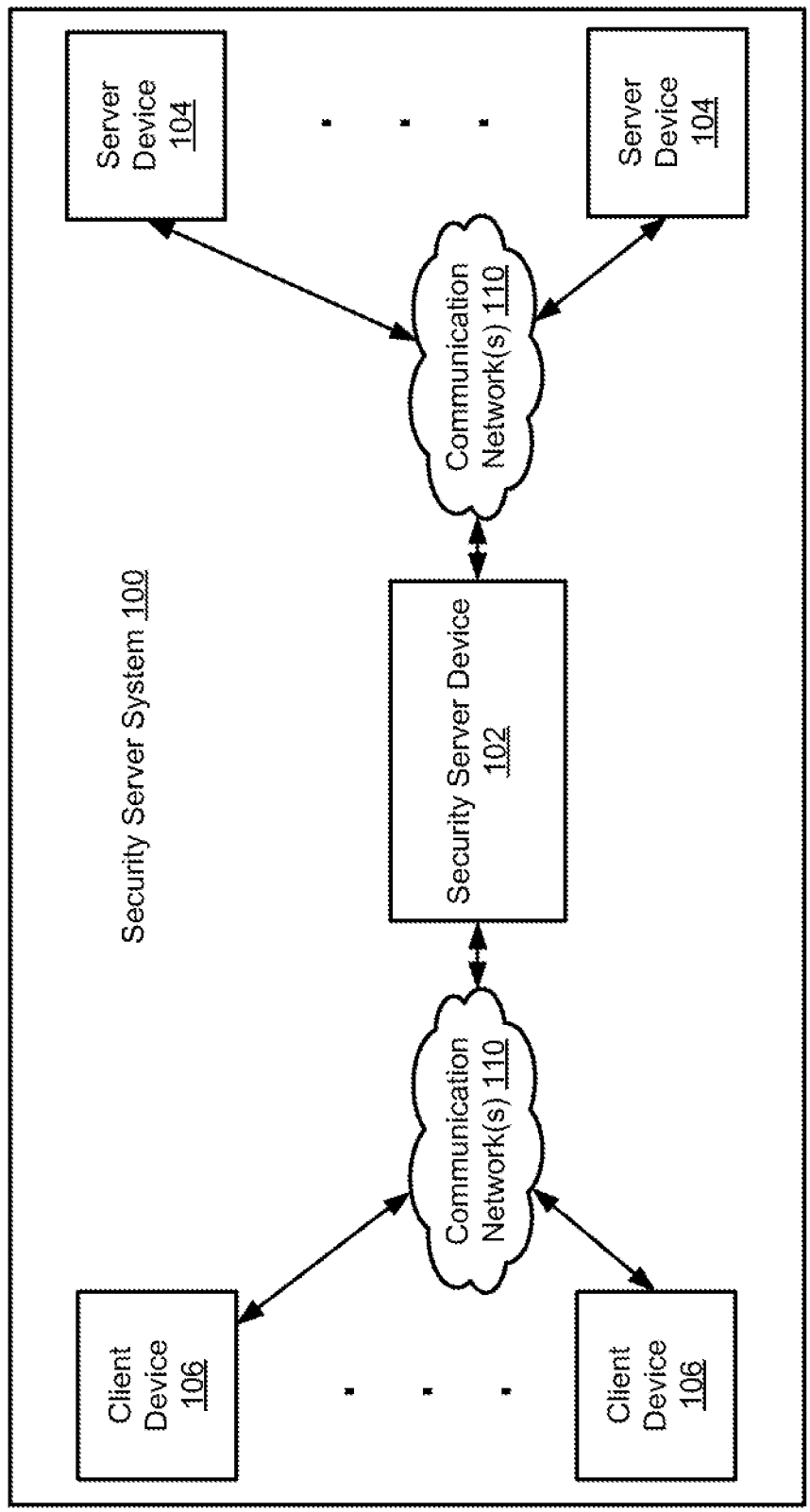
FIG. 1 is block diagram of an exemplary security server system.

While each of the drawing figures illustrates a particular example for purposes of illustrating a clear example, other examples may omit, add to, reorder, or modify any of the elements shown in the drawing figures. For purposes of illustrating clear examples, one or more figures may be described with reference to one or more other figures, but using the particular arrangement illustrated in the one or more other figures is not required in the examples.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any characteristic of the referenced items unless otherwise specified; the terms "such as", "e.g.," "for example", and the like describe one or more examples but are not limited to the described examples(s); the term "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computer elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" (also referred to as a "client device") refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as a "server system", "server computer system", "server device" or "server apparatus") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

As used herein, the term "website" may refer to a collection of web pages, web resources, and other web content made available over the Internet. For example, a first website may include web content hosted by a web server system, such as a first server device, while a second website may include web content hosted by a second web server system, such as a second web server device. Often, the web content of a website shares a single domain name or set of related domain names that are owned or controlled by a common entity. A website may include web page content accessible over the Internet through a browser, and/or web content that is accessible over the Internet from another client application. Such applications may include web applications executing in a browser(s) and/or native application(s) installed on client computing devices (also referred to as "client devices").

This document generally describes systems, methods, devices, and other techniques for automatically making a determination regarding whether a web request was made by a bot or a human user of a client device. An entity that operates a web server system may wish to prevent bots from accessing content hosted by the web server system while allowing legitimate human users to access the content. The disclosed techniques may involve utilizing one or more machine learning models to automatically make a determination as to whether a given web request was initiated by a bot or a human. In some embodiments, the disclosed techniques may involve using a plurality of machine learning models to make such a determination, for example, by combining various machine learning models into an ensemble model and utilizing a majority vote of their outputs to make a final determination regarding whether the request originated from a bot or a human. Various embodiments may use ensemble machine learning models made up of one or more base models that can include supervised machine learning models (e.g., random forest models and logarithmic regression models), semi-supervised machine learning models (e.g., autoencoder with neural network, autoencoder with k-means clustering algorithm, autoencoder with k-nearest neighbors algorithm, autoencoder with random forest) and/or unsupervised machine learning models (e.g., autoencoder model, convolutional neural network with an autoencoder).

The techniques disclosed herein involve deriving features from historical web request logs that can be used to train the machine learning model(s) and deriving similar features from currently received web requests that can then be used as inputs into the trained models to generate an output that indicates whether the received web request was generated by a bot or a human. According to some embodiments, the process of generating features for use as inputs to machine learning models can involve generating a first set of features from the web request logs, deriving a second set of features from the first set of features, and then deriving a reduced set of features from the second set of features. The second set of features may include numerical features and categorical features. Part of the process may include converting the categorical features into numerical values by using techniques such as one hot encoding and/or generating word embeddings using a transformer model such as word2vec or a bidirectional encoder representation (BERT). Further, feature scaling may be applied to the features to normalize the range of features of the data. When the second set of features have been manipulated such that all of the features are represented numerically and have been scaled to normalize the impact of each feature relative to the others, these features can be input into an autoencoder model that outputs a reduced set of features of a number that may be selected by a user. For example, in some embodiments, the autoencoder model may generate a reduced set that is made up of 12 features. This is advantageous because the reduced number of features allows the machine learning models to execute in a relatively quick manner, but the reduced feature set still encapsulates all of the information from the larger set of features, which allows the system to make more accurate predictions about whether a request originated from a bot or a human. Further, the use of an ensemble model of different machine learning models that uses a majority vote can also lead to greater accuracy in making predictions.

Referring to FIG. 1, an exemplary security server system 100 is illustrated. The security server system 100 in this example includes a security server device 102 that is coupled to server devices 104, and client devices 106 via communication network(s) 110, although the security server device 102, server devices, and client devices 106 may be coupled together via other topologies. The security server system 100 also may include other network devices such as routers or switches, for example, which are known in the art and thus will not be described herein. This technology provides a number of advantages including methods, non-transitory computer readable media, security server systems 100, and security server devices 102 that provide for automated bot detection using one or more machine learning models, based on information pulled from logs that are generated in association with received web requests.

In this particular example, the security server device 102, server devices 104, and client devices 106 that are disclosed in FIG. 1 as dedicated hardware devices. However, one or more of the security server device 102, server devices 104, and client devices 106 can also be implemented in software within one or more other devices in the security server system 100. For example, the security server device 102 can be hosted by one or more of the server devices 104, and other network configurations can also be used. Although the description herein is generally directed to a system that is distributed across multiple devices, it should be understood that it is contemplated that the techniques disclosed herein could alternatively be adapted for use on a centralized system.

Figure 2:
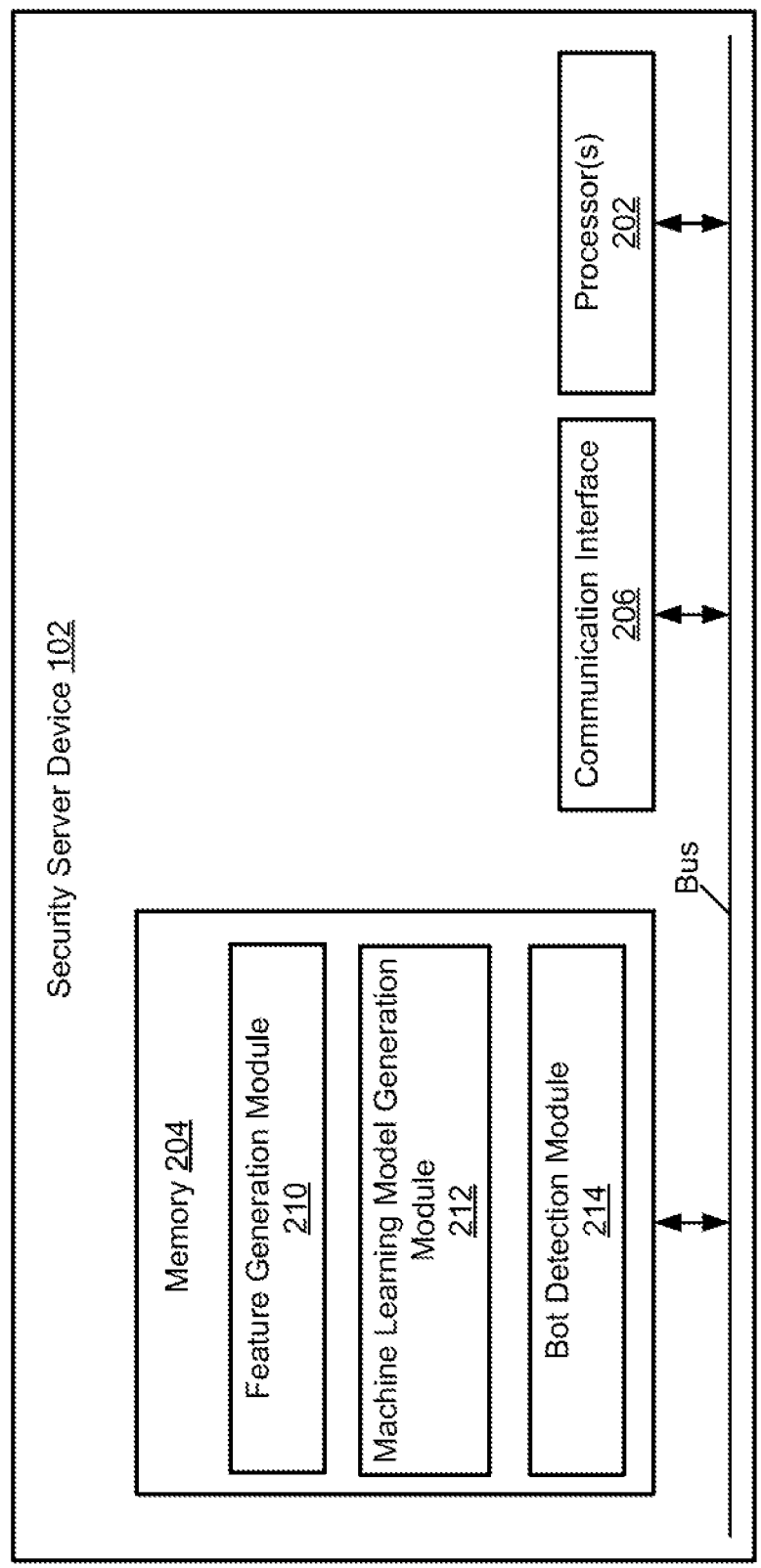
FIG. 2 is a block diagram of an exemplary security server device.

Referring to FIGS. 1-2, the security server device 102 of the security server system 100 may perform any number of functions generating features from web request logs, training one or more machine learning models and automatically detecting bots using the one or more machine learning models. The security server device 102 in this example includes processor(s) 202, a memory 204, and a communication interface 206, which are coupled together by a bus, although the security server device 102 can include other types or numbers of elements in other configurations.

The processor(s) 202 of the security server device 102 may execute programmed instructions stored in the memory 204 of the security server device 102 for any number of functions described and illustrated herein. The processor(s) 202 of the security server device 102 may include one or more central processing units (CPUs) or general purpose processors with one or more processing cores, for example, although other types of processor(s) can also be used.

The memory 204 of the security server device 102 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s), can be used for the memory.

Accordingly, the memory of the security server device 102 can store one or more modules that can include computer executable instructions that, when executed by the security server device 102, cause the security server device 102 to perform actions, such as to transmit, receive, or otherwise process network messages, for example, and to perform other actions described and illustrated below with reference to FIGS. 3-5. The modules can be implemented as components of other modules. Further, the modules can be implemented as applications, operating system extensions, plugins, or the like.

Even further, the modules may be operative in a cloud-based computing environment. The modules can be executed within or as virtual machine(s) or virtual server(s) that may be managed in a cloud-based computing environment. Also, the modules, and even the security server device 102 itself, may be located in virtual server(s) running in a cloud-based computing environment rather than being tied to one or more specific physical network computing devices. Also, the modules may be running in one or more VMs executing on the security server device 102. Additionally, in one or more examples of this technology, virtual machine(s) running on the security server device 102 may be managed or supervised by a hypervisor.

In this particular example, the memory of the security server device 102 includes a feature generation module 210. According to some examples, the feature generation module 210 can generate, modify and reduce feature sets to be used in training one or more machine learning models and to be used as inputs to a machine learning model(s) for the purpose of identifying whether a given web request was initiated by a human or a bot. According to an example, the features generation module 210 can generate a reduced feature set from logs associated with a web request by performing one or more of steps 302, 303, 304, 306, 308, 310 and/or 318 of process 300 shown in FIG. 3, which is described in greater detail below.

In some examples, the feature generation module 210 can generate a set of features to be used as training data for machine learning models using a set of logs that are stored (e.g., in a database of security server device 102) in association with a set of historical web requests. In other words, a database of previously recorded web requests may be stored by the security server device 102 (or another storage device that is accessible by security server device 102) along with logs that are associated with the stored web requests, and the security server device 102 may utilize these stored logs associated with the set of previous web requests to generate a set of reduced features to train one or more machine learning models.

In some examples, the set of stored web requests and associated logs may be labeled, such that for each web request it is known whether the web request was initiated by a bot or a human. In some examples, the set of historical web requests may be unlabeled, in which case the historical web requests may go through a processing of being labeled prior to being used as a training data set. In some examples, the historical web requests may be manually labeled by a human that examines each request and determines whether (e.g., based on the activity associated with the request) the request(s) were performed by a bot or a human. According to some embodiments, the feature generation module 210 may be configured to automatically identify historical web requests that were made by simple bots by, for example, applying heuristics, comparing requests to stored libraries, and/or applying a rules-based approach, (e.g., it may determine that web requests made from uncommon browsers are requests made by bots). While helpful in identifying simple bots, such approaches may not be capable of identifying more advanced or complex bots, in which case a human may need to review the web requests that were not identified as simple bots to determine which of the remaining requests were also created by a bot. Following such determinations, the feature generation module 210 may, for each web request of the stored set of historical web requests, label the associated stored logs as either being associated with a web request that was either initiated by a human or a bot.

The memory 204 of the security server device 102 can also include a machine learning model generation module 212. The machine learning model generation module 212 can train one or more machine learning models using a reduced feature set generated by the feature generation module 210 as training data, as described in greater detail below with respect to steps 312, 314 and 316 of FIG. 3.

The memory 204 of the security server device 102 can also include a bot detection module 214, which can automatically make a determination regarding whether a newly received web request was initiated by a bot or a human and take an appropriate action in response to the determination, as described below with respect to steps 318, 320, 322 and 324 of FIG. 3. In other words, the bot detection module 214 can automatically detect whether a web request received from a client device 106 that is directed to a server device 104 was generated by a bot that is running on the client device 106 or whether it was generated in response to a human operating the client device 106. If the bot detection module 214 determines that the request was initiated by a human, the bot detection module 214 may allow the request, granting access to requested web resources hosted by a server device 104. Conversely, if the bot detection module 214 determines that the request was initiated by a bot, the bot detection module 214 may take some mitigating security action, such as for example, denying the request and preventing the client device 106 from accessing the requested web content on the server device 104 that was the subject of the request or rate limiting the client device 106 to limit the amount of interaction the client device 106 can have with the server device 104 over a given time period.

As shown in FIG. 1, in some examples the security server device 102 may be positioned between client devices 106 and server devices 104, such that the security server device 102 can intercept web requests sent to one or more server devices 104 in order to make a determination as to whether or not the request originated from a bot or a human. In this way, the security server device 102 can, in near real-time, protect the server devices 104 from bots accessing their systems and web content, while allowing legitimate human users access.

The communication interface 206 of the security server device 102 operatively couples and communicates between the security server device 102, the client devices 106 and the server devices 104, which are coupled together at least in part by the communication network(s) 110, although other types or numbers of communication networks or systems with other types or numbers of connections or configurations to other devices or elements can also be used.

By way of example only, the communication network(s) 110 can include local area network(s) (LAN(s)) or wide area network(s) (WAN(s)), and can use TCP/IP over Ethernet and industry-standard protocols, although other types or numbers of protocols or communication networks can be used. The communication network(s) 110 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs) hosting HyperText Transfer Protocol (HTTP), combinations thereof, and the like.

The security server device 102 is illustrated in this example as including a single device, but can include multiple devices in other examples, each of which has processor(s) (each processor with processing core(s)) that implement step(s) of this technology. In these examples, one or more of the devices can have a dedicated communication interface or memory. Alternatively, one or more of the devices can utilize the memory 204, communication interface 206, or other hardware or software components of one or more other of the devices included in the security server device 102.

Accordingly, one or more of the devices that together comprise the security server device 102 can be standalone devices or integrated with one or more other devices or apparatuses, such as the server device 104, for example. Moreover, one or more of the devices of the security server device 102 can be in a same or a different communication network including one or more public, private, or cloud networks, for example. In yet other examples, a plurality of protection server apparatus are deployed, within and/or outside of a local area network associated with the server device 104, which communicates with any number of application servers or end station computers, and other network topologies can also be used.

The security server device 102 also may also be coupled via an I/O subsystem to at least one output device in some examples. The output device can be a digital computer display. Examples of a display that may be used in various embodiments include a touch screen display or a light-emitting diode (LED) display or a liquid crystal display (LCD) or an e-paper display. The security server device 102 may include other type(s) of output devices, alternatively or in addition to a display device. Examples of other output devices include printers, ticket printers, plotters, projectors, sound cards or video cards, speakers, buzzers or piezoelectric devices or other audible devices, lamps or LED or LCD indicators, haptic devices, actuators or servos.

At least one input device may be coupled to an I/O subsystem of the security server device 102 in some examples for communicating signals, data, command selections or gestures to processor 304. Examples of input devices include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device, which may perform cursor control or other automated control functions such as navigation in a graphical interface on a display screen, alternatively or in addition to input functions. A control device may be a touchpad, a mouse, a trackball, or cursor direction keys for communicating direction information and command selections to processor(s) 202 and for controlling cursor movement on a display. An input device may have at least two degrees of freedom in two axes, a first axis (e.g., x) and a second axis (e.g., y), that allows the device to specify positions in a plane. Another type of input device may be a wired, wireless, or optical control device such as a joystick, wand, console, steering wheel, pedal, gearshift mechanism or other type of control device. An input device may include a combination of multiple different input devices, such as a video camera and a depth sensor.

In another example, the security server device 102 may be an internet of things (IoT) device or other type of network device in which one or more of an output device, input device, and control device are omitted. Or, in such an embodiment, an input device may be one or more cameras, motion detectors, thermometers, microphones, seismic detectors, other sensors or detectors, measurement devices or encoders and an output device may be a special-purpose display such as a single-line LED or LCD display, one or more indicators, a display panel, a meter, a valve, a solenoid, an actuator or a servo.

Referring back to FIG. 1, the server device(s) 104 of the security server system 100 in this example may be a commercial web server hosting one or more webpages that is accessible by client device(s) 106. The webpages may request web resources from any number of other domains. Example types of requests include XMLHttpRequests, Fetch API requests, WebSockets, WebRTCs, Beacons, form submissions, resource fetching (such as links, scripts, images, videos, etc.), and others.

Each of the server devices 104 includes processor(s), memory, and a communication interface, which are coupled together by a bus or other communication link (not illustrated), although other numbers or types of components could be used. The server devices 104 in this example can include application servers or database servers, for example, although other types of server devices 104 can also be included in the security server system 100. The server device(s) 104 in this example can exchange communications to facilitate interactions with hosted web applications, which are optionally protected by the security server device 102 as described and illustrated herein, by users of the client device(s) 106.

Accordingly, in some examples, a server device 104 may process web requests (e.g., requests to view web content, login and other requests) received from the client device(s) 106 via the communication network(s) 110 according to the HTTP-based application RFC protocol, for example. A protected web application may be operating on the server device 104 and transmitting data (e.g., files or web pages) to the client device(s) 106 in response to requests from the client device(s) 106. The server device 104 may be hardware or software or may represent a system with multiple servers in a pool, which may include internal or external networks.

Although the server device(s) 104 are illustrated as single devices, a server device 104 in other examples may include multiple servers distributed across one or more distinct network computing devices that together server device 104. Moreover, the server device(s) 104 is not limited to a particular configuration. Thus, the server device(s) 104 may contain network computing devices that operate using a master/slave approach, whereby one of the network computing devices of the server device(s) 104 operate to manage or otherwise coordinate operations of the other network computing devices. A server device 104 may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, a server device 104 can operate within the security server device 102 itself rather than as a stand-alone server communicating with the security server device 102 via the network(s) 110. In this example, a server device 104 may operate within the memory 204 of the security server device 102. Accordingly, any number of client devices 106 and server devices 104 may be used. The number of client devices 106 and server devices 104 are shown in FIG. 1 merely for purposes of providing an illustrative example.

Each of the client device(s) 106 of the security server system 100 in this example includes any type of computing device that can exchange network data and interface with the webpages, such as mobile, desktop, laptop, or tablet computing devices, virtual machines (including cloud-based computers), or the like. Each of the client device(s) 106 in this example includes a processor, memory, and a communication interface, which are coupled together by a bus or other communication link (not illustrated), although other numbers or types of components could also be used.

The client device(s) 106 may run interface applications, such as standard web browsers or native client applications, which may provide an interface to make requests for, and receive content stored on, the server device 106 via the network(s) 110. The client device(s) 106 may further include a display device, such as a display screen or touchscreen, or an input device, such as a keyboard, for example (not illustrated).

Although the exemplary security server system 100 with the security server device 102, server device(s) 104, client device(s) 106, and communication network(s) 110 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the security server system 100, such as the security server device 102, server device(s) 104, or client device(s) 106, for example, may be configured to operate as virtual instances on the same physical machine. In other words, one or more of the security server device 102, server device(s) 104, or client device(s) 106 may operate on the same physical device rather than as separate devices communicating through communication network(s). Additionally, there may be more or fewer security server devices 102, server devices 104, or client devices 106 than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having executable or programmed instructions stored thereon, such as in the memory 204, ROM, or storage of the security server device 102, for one or more aspects of the present technology, as described and illustrated by way of the examples herein. The instructions in some examples include executable code that, when executed by one or more processors, such as one more processors 202 of the security server device 102, cause the processors to carry out steps necessary to implement the methods of the examples of this technology that are described and illustrated herein.

Figure 3:
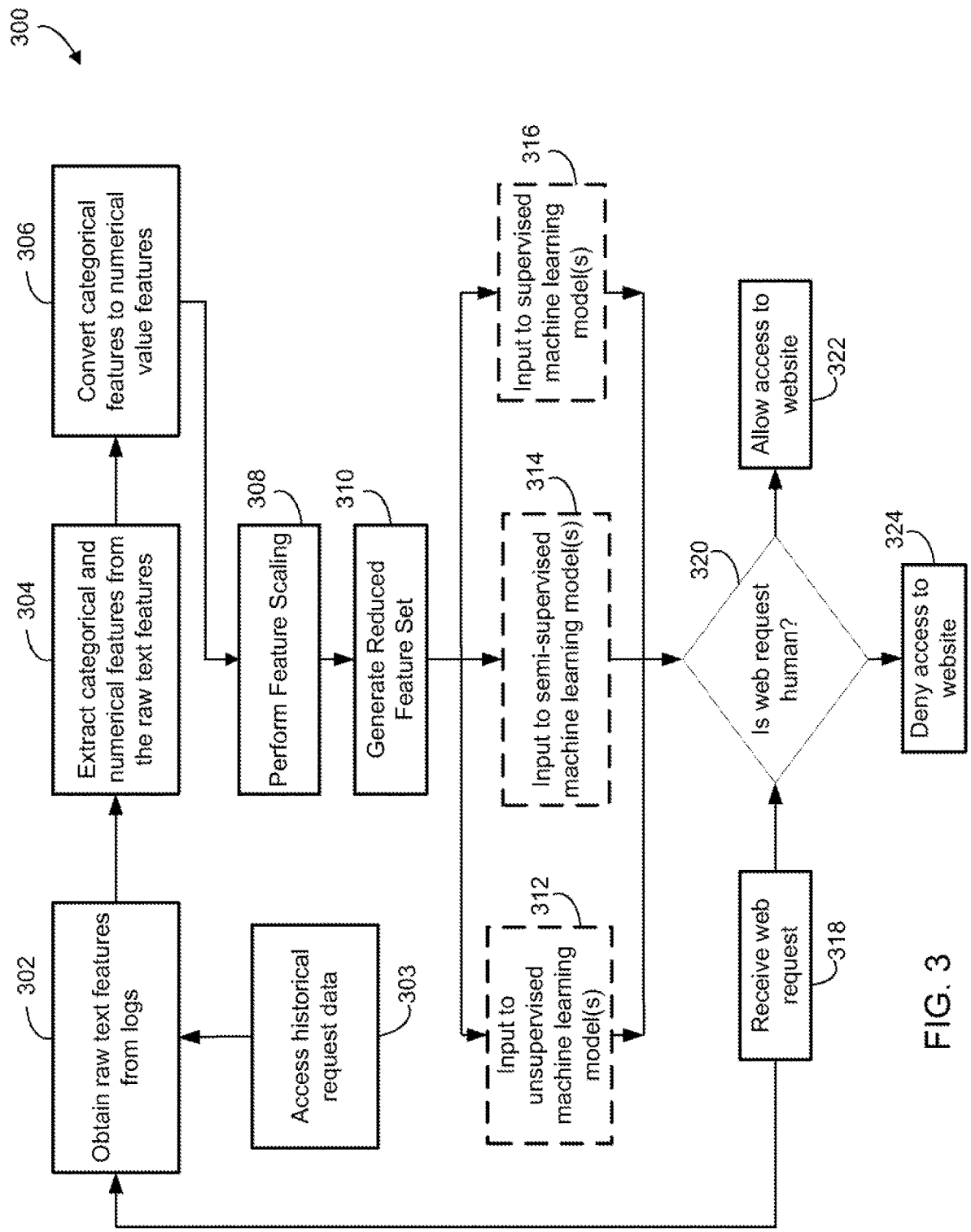
FIG. 3 is a flow diagram of an exemplary method for providing bot detection using a machine learning model.

Referring to FIG. 3, a flow diagram of an example method 300 of providing bot detection using a machine learning model is illustrated. In step 302 in this example, the security server device 102 of the security server system 100 obtains raw text features from logs. As will be understood by those of skill in the art, web logs (which may be referred to as "traffic logs" or "logs") may be created based on and in association with the creation and/or receipt of web requests. A web log provides an audit trail of every web request a server responds to and contains various information about the request. For example, when a client device 106 transmits a web request to access content of a server device 104, real time traffic logs may be created that include raw data such as the Internet Protocol (IP) address of the client device, the Uniform Resource Locator (URL) of a requested website or webpage, a request path, and other such information.

According to some examples, one or more raw text features can be read from the logs. In an example, the raw text features that are read from the logs may include one or more of an IP address, HTTP version, Request path, HTTP method, User Agent and HTTP Headers. The IP address is the IP address of the requesting device (e.g., client device 106). The HTTP version is the version of HTTP being used (e.g., HTTP/1.0 or HTTP/1.1) by the requesting device. The Request path is the string of information that follows the top level domain name in a URL. The HTTP method indicates an HTTP request of an action that server is requested to perform (e.g., GET, POST, etc.). The User Agent is a header that identifies the type of software agent (e.g., type of browser, type of email reader, etc.) being used by the requesting device. For example, the User Agent may indicate whether the requesting device is using Chrome, Firefox, Safari or some other browser when making the web request. HTTP headers are fields of an HTTP request that pass additional context and metadata about the request. As will be understood by those of skill in the art, reading raw text features from the logs associated with web requests may involve some cleaning and/or reformatting of the data. For every newly received request, the security server device 102 may store the associated logs and determinations of whether the requests were initiated by a bot or a human.

When used for the process of creating features to train machine learning models, the security server device 102 can obtain raw text features from stored logs associated with a plurality of past web requests based on accessing historical request data in step 303. Historical request data may include stored logs associated with previous requests that may be stored in memory 204 of security server device 102 or some other data storage location that is accessible by security server device 102. The logs may correspond to a plurality of previous web requests made by one or more client devices 106. In some examples, the historical request data is labeled as either having been initiated by a human or a bot. In other words, in some examples, with respect to each web request in the stored historical data it is known whether the web request was initiated by a bot or a human.

When used for the process of attempting to classify a new incoming request as having been initiated by a bot or a human, the security server device 102 can obtain raw text features from one or more logs associated with a new request that is received in step 318. In step 318, a new web request may be generated by a client device 106 and transmit to a server device 104. In some examples, the web request may be redirected to or otherwise intercepted by the security server device 102 prior to it reaching the targeted server device 104. In some examples, the targeted server device 104 may receive the request and forward it to the security server device 102 for processing before responding to the request. In this way, the security server device 102 can make a determination regarding whether the newly received request was initiated by a bot or a human in order to prevent the server device 104 from responding to the request to provide access to requested content in the event that the request is determined to have been initiated by a bot.

In step 304, the security server device 102 extracts categorical and numerical features from the raw text features obtained in step 302. A numerical feature is a feature that is a number (e.g., _timestamp, path_/_count, etc.). A categorical feature is a feature that, although it may include numbers, is nevertheless not numerical value (e.g., IP addresses, User Agent, city/country name, etc.). According to some embodiments, the User Agent feature, data or aspects thereof may be obtained both as a raw text feature of logs and may also be considered as and treated as an extracted categorical feature. For example, in some embodiments, the User Agent feature (or aspects thereof) may be read from the logs and may be extracted as a categorical feature by transcribing/translating the data into a form for use as one or more categorical features (e.g., a browser type may be extracted from a User Agent raw text feature as a User Agent categorical feature). The categorical and numerical features are extracted from the raw text features by security server device 102 using various rules and/or algorithms. For example, in step 302 the raw text feature be a path (e.g., "examplepath.php") that may be obtained from logs of a web request (e.g., by scanning and copying it from the logs) and from this raw text feature, categorical/numerical features may be extracted by for example, extracting the "is_script" feature from the path, which may represent the end or extension type of the path (e.g., ".php", ".jsp", ".asp", etc.) and converting it into a numerical feature. For example, in some embodiments, it may be converted into a numerical feature of "0" if none of a predetermined list of extensions are present in the subject path, whereas it may be converted to a numerical feature of "1" if the subject path includes an extension/ending type that matches one of the predetermined list. Alternatively, in some examples, the "is_script" feature may be converted into a numerical feature by translating the extension type to a number based on a predetermined correlation (e.g., the numerical feature may be "1" when the "is_script" is ".php", "2" when it is ".jsp", "3" when it is ".asp", etc.). Following this process of extracting categorical and numerical features from the raw text features, the number of features may be greatly increased as in some cases multiple features may be generated using the same raw text feature or combination of raw text features.

The table illustrated in FIG. 4 shows an exemplary non-exhaustive list of example categorical and numerical features that may be extracted from the raw text features and provides an explanation of what each feature is. Other features that may be extracted can include "ua_error", which indicates an error parsing the UA using (e.g., when using Python), "host_error", which indicates an error parsing the host header (e.g., when using Python), "is_env", which indicates the path ends with "env", "path_ends_/", which indicates the path ends with "/", "path_._count", which indicates a count of "." in the path, "ua_parser_class", which provides an indication that a Python module has detected this UA as being a bot UA, "old_ua", which indicates that a browser is a very old version (e.g., based on various specified statistics, values and/or features associated with the browser), "mobile_ua", which indicates that the US a mobile (e.g., on a smartphone), "ua_*", which indicates the user agent (e.g., the type of browser, such as Chrome, Firefox, Safari, etc.), "os", which indicates the operating system (e.g., Windows, Linux, Mac OS, etc.), "http_ver_*", which indicates the HTTP version (e.g., 1.0, 1.1 or none), "http__method_cat_*", which indicates the category of an HTTP method being used, which can include common methods (e.g., GET, POST, HEAD, PUT), unusual methods (e.g., DELETE, OPTIONS, PATCH, SEARCH, DEBUG, INDEX, CONNECT, REGISTER, PROPFIND), track/trace methods (e.g., TRACK or TRACE) and unused methods (e.g., the remaining methods), and "ip_cat_*", which indicates the category of internet protocol being used (e.g., IPv6, IPv4 global, IPv4 private, etc.). It will be understood that the various raw text features, numerical text features and categorical text features described herein are merely exemplary and in different examples more, less, or different features may be obtained, derived and/or utilized by the security server device 102.

In step 306, the security server device 102 converts the categorical features to numerical values features. Different methods can be used to convert categorical features to numerical value features, such as one hot encoding and creating word embeddings (e.g., using a transformer model). The numerical value features may be vectors. For categorical features that are expected to have a relatively small number of categories, the security server device 102 may use one hot encoding to convert the categorical feature into a numerical value feature. As will be understood by those of skill in the art, one hot encoding is a process that involves assigning a number to each possible category. For example, if one hot encoding a feature the represents a time zone of the requesting device, "Atlantic Standard Time" may be represented by "1", "Eastern Standard Time" may be represented by "2", "Central Standard Time" may be represented by "3", and so on. As will be further understood by those of skill in the art, categorical features can be converted to numerical value features by creating word embeddings using a transformer model, such as for example, word2vec or Bidirectional Encoder Representations (BERT), which can take a string of words and convert them into a vector that encodes their meaning. This technique is particularly useful for converting a categorical feature such as User Agent, which has very a large number of possible variations that can include subtle differences in wording/spelling because of the ever-changing variations of legitimate user agents (e.g., revised/new versions of browsers) as well as variations/misspellings from bots attempting to pose as legitimate user agents. In one example, the User Agent feature is converted to a numerical value feature using by creating word embeddings using a transformer model and all other categorical features are converted to numerical value features using one hot encoding. However, it should be understood that this is only an example and in different embodiments, different categorical features can be converted to numerical value features using different methods.

In step 308, the security server device 102 performs feature scaling on the numerical features and numerical value features to generate scaled numerical features and scaled numerical value features. As will be understood by those of skill in the art, feature scaling is a known process that normalizes the range of a feature relative to other features so that particular features do not unintentionally have an outsized effect on the model. In some embodiments, this step may be optional or may include other aspects such as intentionally weighting selected features as being more important or impactful than other selected features.

In step 310, the security server device 102 generates a reduced feature set from the scaled numerical features and scaled numerical value features. The security server device 102 may generate a reduced feature set by inputting the scaled numerical and scaled value features into an autoencoder model that outputs a reduced set of features that are represented as a vector. The autoencoder utilizes non-linear transformations to encode a given vector into smaller dimensions and it can generate complex encodings from the set of features that can precisely capture the various patterns of bots and humans. In some examples, a user may input a selected number of reduced features for the autoencoder model to output. In one example, the autoencoder model is set to output a reduced feature set that is made up of a total of 12 features. Thus, in such case, following the steps described above, a web request that was originally represented by data captured in logs in step 302, may ultimately be represented by a 12-dimensional vector in step 310, although it will be understood that in other examples a different number of features may be selected. Experimentally, 12 dimensions was found to have a high level of accuracy while also maintaining a very fast processing time. Once all of the features associated with a given request have been converted into a vector, they are in a suitable format to be utilized as inputs to one or more machine learning models, either for training of the model(s) or for classification of the associated web request.

In step 312, the security server device 102 optionally inputs the reduced feature set to one or more unsupervised machine learning models. In step 314, the security server device 102 optionally inputs the reduced feature set to one or more semi-supervised machine learning models. In step 316, the security server device 102 optionally inputs the reduced feature set to one or more supervised machine learning models. In various embodiments, one or more different machine learning models may be trained and utilized by the security server device 102 to classify new requests as having been initiated by a bot or a human, such as for example, random forest models, logarithmic regression models, autoencoder models, autoencoder with neural network models (i.e., an output of the autoencoder model serves as an input to a neural network model), autoencoder with k-means clustering algorithm, autoencoder with k-nearest neighbors algorithm, autoencoder with random forest models, convolutional neural network with an autoencoder model, support vector machines, feed-forward neural networks, and/or any other suitable machine learning model. It is desirable to use models that maximize recall, which is a measure of how many bots are recalled correctly, which is proportional to the number of true positives and inversely proportional to the number of false negatives. In some examples, to maximize recall an autoencoder with random forest can be used to maximize recall for supervised learning, whereas for unsupervised learning an autoencoder with a means clustering algorithm may be used to maximize recall. As will be understood by those of skill in the art, each and any of these different types of machine learning models can be trained to make predictions about whether a vector representing the features of a newly received web request represents a web request that was initiated by a bot or a human, based on the training the model receives using a set of training data (i.e., a set of vectors representing historical web requests and whether they are bots or humans).

For example, a K-means clustering algorithm can be trained by taking as inputs, a plurality of vectors in which each vector of the plurality represents a reduced feature set of a corresponding historical web request that is known to have been initiated by a bot or a human. The K-means clustering algorithm involves plotting all of the vectors and then clustering them into a selected number of clusters, such as for example, 100 clusters, wherein each cluster represents a plurality of web requests that are most similar to one another based on feature information of the web requests, as represented by the vectors. Each cluster can then be labeled as a bot or a human based the labels of a majority of the vectors within the cluster. For example, if more than half of the vectors in a given cluster are labeled as being associated with a web request that was initiated by a human, then that cluster will be labeled as "human", whereas clusters that are made up of a majority of vectors labeled as "bot" will be labeled as "bot". These labeled clusters represent the trained model, and now when a new web request is received, a prediction can be made about whether the new request is was initiated by a bot or a human at step 324.

For example, when a new web request is received at step 310, it can be converted into a vector that represents a reduced feature set as described above in steps 302, 304, 306, 308 and 310, and the vector representing the new web request can be input into one or more trained machine learning models to make a prediction as to whether the request was initiated by a bot or a human. For example, in the case of the K-means clustering algorithm described above, the vector can be plotted and it can be determined whether the vector is positioned within a cluster that has been labeled as a "human" or a "bot". If the security server device 102 determines that the new vector is located within a cluster that has been labeled as "human", then the security server device 102 will output a prediction that the newly received request was initiated by a human, or if the new vector is located within a cluster that has been labeled as "bot", then the security server device 102 will output a prediction that the newly received request was initiated by a bot.

In some examples, the machine learning model that makes the prediction may be an ensemble model that is made up of a plurality of different machine learning models that have been trained using the reduced feature set (represented as vectors) of the historical web request data. In this case, the vector representation of the reduced feature set of a newly received web request can be provided as an input to each base model of the ensemble model and each base model will output its own prediction as to whether the new request was initiated by a bot or a human. The ensemble model can determine a final prediction by taking a majority vote of all of the base models. For example, if the ensemble model is made up of 3 base models that each output either "bot" or "human", the ensemble model will tally the results and if 2 or more of the base models have predicted that the new request was initiated by a "bot" then the ensemble model will output a prediction that the new request was initiated by a "bot", otherwise it will output a prediction that the request was initiated by a "human". It is contemplated that any number or type of machine learning model described herein or that is otherwise suitable to make such predictions may be utilized in an ensemble model. By utilizing a number of different types of machine learning models, the accuracy of the system can be increased and/or a confidence level of the prediction can be generated. For example, if the system uses an ensemble model that is made up of 7 different base models that all generate the same output (e.g., "bot"), then the system can have a high confidence that the prediction is correct as opposed to if for example, only 4 of the models predict "bot" and 3 predict "human".

As will be appreciated by those of skill in the art, a random forest model is a tree-like structure that can be trained, based on a target variable (i.e., whether the request originated from a bot or human), that can be trained using supervised learning to determine whether a new request was initiated by a bot or a human. Further, as will be appreciated, an autoencoder is an unsupervised model that can determine a threshold that can be used to determine whether the features (as represented by a vector) of a new request represent a bot or a human based on whether it exceeds the determined threshold or not. In various examples, one or more of different types of models may be used to make predictions, such as for example, transformer models (e.g., Bert, ROBERTa, etc.), pretrained models and generative models.

As described previously above, in step 318, the security server device 102 receives a web request from a client device 106 that is requesting access to a webpage hosted by a server device 104.

In step 320, the security server device 102 makes a determination whether the request received in step 318 originated from a human operating the client device 106 or whether it originated from a bot running on (or posing as) the client device 106. For example, if upon inputting a vector representing a reduced feature set of a new request into one or more trained machine learning models, the one or more trained machine learning models generate an output providing a prediction that the web request was initiated by a bot, then the security server device 102 will determine that the web request was initiated by a bot, or similarly if the output predicts that the web request was initiated by a human, then the security server device 102 will determine that the web request was initiated by a human.

In step 322, the security server device 102 allows the client device 106 to access the requested webpage hosted by the server device 106 in response to determining that the web request was initiated by a human. In some embodiments, this may be achieved by forwarding an incepted request to the target server device 104 to allow the server device to respond to the request. In the case where the target server device 104 received the request from the client device 106 and forwarded it to the security server 102, allowing the client device 106 to access the requested webpage hosted by the server device 106 may include transmitting a message to the server device 104 that indicates that the request is allowed, which may cause the server device 104 to respond to the request. In other words, in this case, upon receiving the initial request, the server device 104 may forward it to the security server device 102 and await a response from the security device 102 indicating that the server device 104 may allow the request before responding to the client device 106.

In step 324, the security server device 102 denies the client device 106 access to the requested webpage hosted by the server device 106 in response to determining that the web request was initiated by a bot. For example, the security server device 102 may either prevent communications from the server device 104 from proceeding to the client device 106 or may otherwise send a communication to the server device 104 instructing it to not provide access to the requested webpage to the client device.

Figure 5:
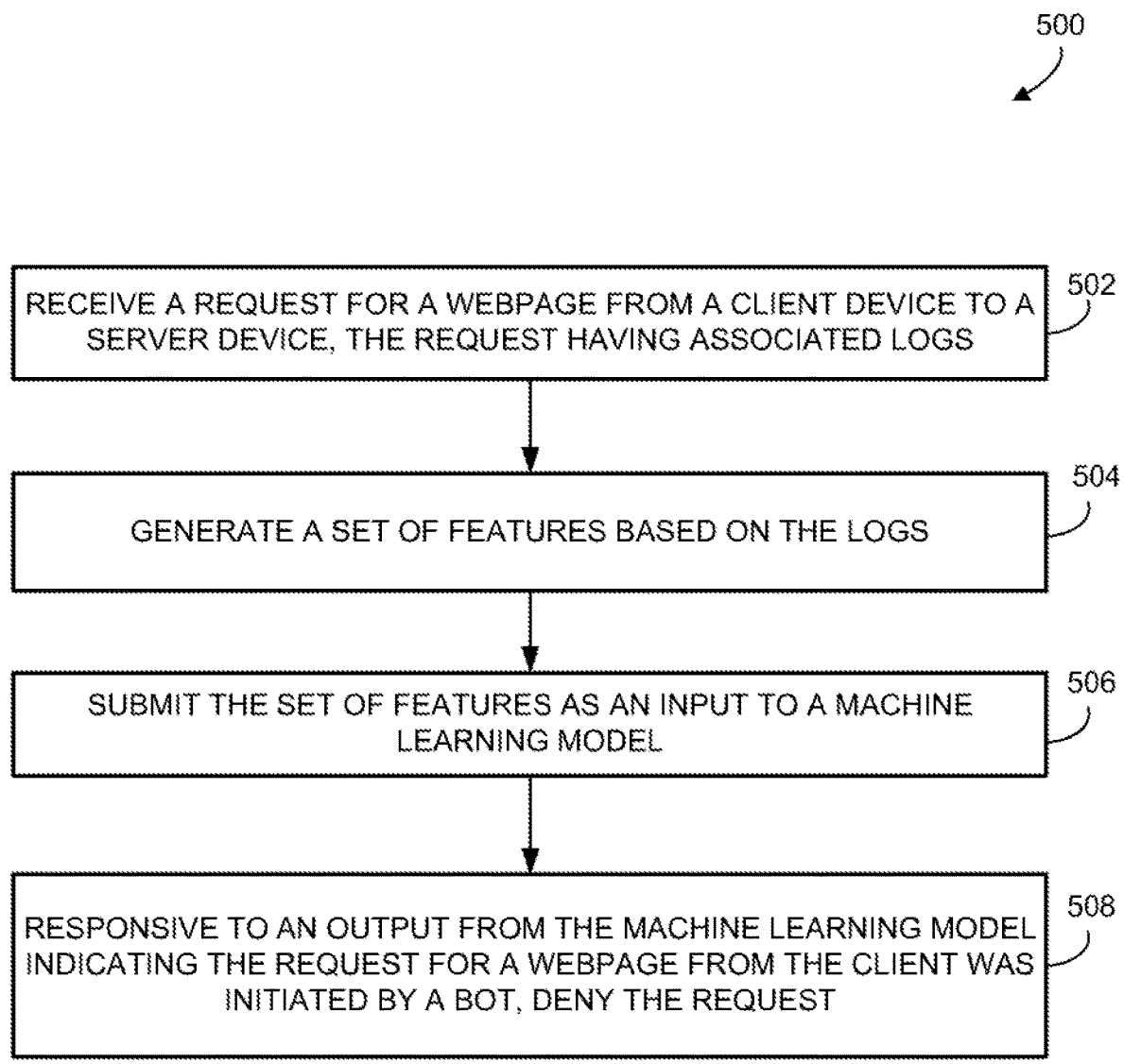
FIG. 5 is a flowchart of an exemplary method for detecting a bot using a machine learning model.

Referring to FIG. 5, a flow diagram of an example method 500 of detecting a bot using a machine learning model is illustrated. In step 502 in this example, the security server device 102 of the security server system 100 receives a request for a webpage from a client device 106 to a server device 104. For example, as described previously above with respect to FIGS. 1, 2 and 3, the security server device 102 may receive the request for a webpage from the client device 106. The request will have associated logs, that contain raw text features.

In step 504, the security server device 102 generates a set of features based on the logs.

According to some examples, generating the set of features based on the logs may include extracting raw text features from the logs as described above with respect to step 302 of FIG. 3, generating numerical features and categorical features based on the raw text features as described above with respect to step 304 of FIG. 3, generating a reduced number of features based on the numerical features and the categorical features as described above with respect to step 306 of FIG. 3, and inputting the set of scaled features to an autoencoder model that outputs the reduced set of features as described above with respect to step 310 of FIG. 3.

In some examples, generating a reduced set of features may include converting the categorical features to numerical value features, generating a set of scaled features by applying feature scaling to the numerical features and numerical value features and inputting the set of scaled features to an autoencoder model that outputs the reduced set of features. One or more of the categorical features may be converted to numerical value features using one hot encoding. Further, one or more of the categorical features may be converted to numerical value features by utilizing a transformer, such as word2vec or BERT, to generate word embeddings. In some examples, the reduced number of features may be selected to be a set of 12 features that are represented as a vector, although in other examples a different number of reduced features may be selected.

In some examples, the step of scaling the features to create scaled features may involve scaling only one, some or all of the numerical features and numerical value features. In some examples, the step of scaling the features to create scaled features may be excluded and the unscaled features may be used to create the reduced feature set.

In step 506, the security server device 102 submits the set of features as an input to a machine learning model. In the case of a reduced feature set generated from historical web request data, input features can be used to train one or more machine learning models, whereas in the case where the reduced feature set is generated from a newly received web request, the input features can be used to generate a prediction about whether the newly received web request was initiated by a human or a bot.

In some examples, the machine learning model may be an ensemble model having an output that is determined by a majority vote. The ensemble model may include one or more supervised machine learning models, unsupervised machine learning models and/or semi-supervised machine learning models. According to some embodiments, it may be beneficial to select the type and/or amount of models in the ensemble model based on the amount of computing resources available as some models require a heavier computational load than others. For example, in cases where limited computing resources are available the ensemble model may include an auto encoder with simple machine learning models. In some embodiments, if a large amount of computing resources are available the ensemble model may include transformer models (e.g., BERT models) or any other pretrained models. It will be understood that these are merely examples and it is contemplated that any combination of suitable models may be used in the ensemble model according to various embodiments.

In some examples, a first machine learning model of the ensemble model may be a K-means clustering algorithm that is applied to a set of training data features represented by vectors to generate a plurality of clusters. For example, each feature of the set of reduced features generated in step 310 of FIG. 3 may be represented as a vector that can be plotted.

The security server device 102 may generate a set of training data features by taking historical logs associated with previous requests for which it is known whether each request was generated by a bot or a human and using them to generate a reduced feature set in accordance with the techniques described herein. For each of the plurality of clusters generated by the K-means clustering algorithm, the security server device 102 may determine that the cluster represents a human when a majority of vectors within the cluster have labels that correspond to a human and may determine that the cluster represents a bot when a majority of vectors within the cluster have labels that correspond to a bot.

In step 508, in response to an output of the machine learning model indicating the request for a webpage received from the client device was initiated by a bot, the security server device 102 denies the request.

According to some embodiments, the method 500 may further include that in response to an output of the machine learning model indicating that the request for a webpage received from the client was initiated by a human, the security server device 102 allows the request.

With this technology, automated bot detection can be achieved in near real-time. The system can advantageously encapsulate a large amount of feature information that allows it to pick up on subtleties in the data that would be hard to detect or accurately classify with a rules-based approach. The disclosed process of feature extraction and reduction allows the system to retain much of the feature information while not creating a large and time-consuming processing load. Thus, the system can process and make predictions about newly received web requests in near real-time with little delay, thereby allowing it to filter out requests made by bots without significantly negatively impacting the user experience of legitimate users. Further, the use of an ensemble machine learning model can increase the accuracy and confidence of predictions made by the system, greatly reducing the number of false positives as compared to other methods currently being used.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by a security server system comprising one or more security server devices, server devices, or client devices, the method comprising:
   receiving a request for a webpage from a client device to a server device, the request associated with one or more associated logs;
   generating, based on the received request and the one or more associated logs, a set of features representing the request, wherein the generated set of features has a smaller number of the features than features in the one or more associated logs;

inputting the set of features generated based on the received request and the one or more associated logs into a trained machine learning model; and responsive to receiving an output of the trained machine learning model indicating the request for a webpage from the client device was initiated by a bot, denying the request to prevent an access to the server device by the client device.

2. The method of claim 1, wherein the generating the set of features comprises:

extracting raw text features from the one or more associated logs;

generating, based on the raw text features, numerical features and categorical features; and generating, based on the numerical features and categorical features, a reduced number of features.

3. The method of claim 2, wherein the generating a reduced set of features comprises:

converting the categorical features to numerical value features by using one hot encoding or utilizing a transformer to generate word embeddings;

generating a set of scaled features by applying feature scaling to the numerical features and numerical value features; and inputting the set of scaled features to an autoencoder model that outputs the reduced set of features.

4. The method of claim 1, wherein the machine learning model comprises an ensemble model having an output that is determined by a majority vote, the ensemble model comprising one or more of:

a supervised machine learning model;
an unsupervised machine learning model; or
a semi-supervised machine learning model.

5. The method of claim 4, wherein a first machine learning model of the ensemble model is trained by:

applying a K-means clustering algorithm to a set of training data features represented by vectors to generate a plurality of clusters; and for each cluster of the plurality of clusters, determining that the cluster represents a human when a majority of vectors within the cluster have labels that correspond to a human and determining that the cluster represents a bot when a majority of vectors within the cluster have labels that correspond to a bot.

6. A security server device, comprising memory comprising programmed instructions stored thereon and one or more processors configured to be capable of executing the stored programmed instructions to:

receive a request for a webpage from a client device to a server device, the request associated with one or more associated logs;

generate, based on the received request and the one or more associated logs, a set of features representing the request, wherein the generated set of features has a smaller number of the features than features in the one or more associated logs;

input the set of features generated based on the received request and the one or more associated logs into a trained machine learning model; and responsive to receiving an output of the trained machine learning model indicating the request for a webpage from the client device was initiated by a bot, deny the request to prevent an access to the server device by the client device.

7. The device of claim 6, wherein for the generating the set of features, the processors are further configured to be capable of executing the stored programmed instructions to:

extract raw text features from the one or more associated logs;

generate, based on the raw text features, numerical features and categorical features; and generate, based on the numerical features and categorical features, a reduced number of features.

8. The device of claim 7, wherein for the generating a reduced set of features, the processors are further configured to be capable of executing the stored programmed instructions to:

convert the categorical features to numerical value features by using one hot encoding or utilizing a transformer to generate word embeddings;

generate a set of scaled features by applying feature scaling to the numerical features and numerical value features; and input the set of scaled features to an autoencoder model that outputs the reduced set of features.

9. The device of claim 6, wherein the machine learning model comprises an ensemble model having an output that is determined by a majority vote, the ensemble model comprising one or more of:

a supervised machine learning model;
an unsupervised machine learning model; or
a semi-supervised machine learning model.

10. The device of claim 9, wherein the processors are further configured to be capable of executing the stored programmed instructions to train a first machine learning model of the ensemble model by:

applying a K-means clustering algorithm to a set of training data features represented by vectors to generate a plurality of clusters; and for each cluster of the plurality of clusters, determining that the cluster represents a human when a majority of vectors within the cluster have labels that correspond to a human and determining that the cluster represents a bot when a majority of vectors within the cluster have labels that correspond to a bot.

11. A non-transitory computer readable medium having stored thereon instructions comprising executable code that, when executed by one or more processors, causes the processors to:

receive a request for a webpage from a client device to a server device, the request associated with one or more associated logs;

generate, based on the received request and the one or more associated logs, a set of features representing the request, wherein the generated set of features has a smaller number of the features than features in the one or more associated logs;

input the set of features generated based on the received request and the one or more associated logs into a trained machine learning model; and responsive to receiving an output of the trained machine learning model indicating the request for a webpage from the client device was initiated by a bot, deny the request to prevent an access to the server device by the client device.

12. The non-transitory computer readable medium of claim 11, wherein for the generating the set of features, the executable code, when executed by the processors further causes the processors to:

extract raw text features from the one or more associated logs;

generate, based on the raw text features, numerical features and categorical features; and generate, based on the numerical features and categorical features, a reduced number of features.

13. The non-transitory computer readable medium of claim 12, wherein for the generating the reduced set of features, the executable code, when executed by the processors further causes the processors to:
convert the categorical features to numerical value features by using one hot encoding or utilizing a transformer to generate word embeddings;
generate a set of scaled features by applying feature scaling to the numerical features and numerical value features; and
input the set of scaled features to an autoencoder model that outputs the reduced set of features.

14. The non-transitory computer readable medium of claim 11, wherein the machine learning model comprises an ensemble model having an output that is determined by a majority vote, the ensemble model comprising one or more of:
a supervised machine learning model;
an unsupervised machine learning model; or
a semi-supervised machine learning model.

15. The non-transitory computer readable medium of claim 14, wherein the executable code, when executed by the processors further causes the processors to train a first machine learning model of the ensemble model by:
applying a K-means clustering algorithm to a set of training data features represented by vectors to generate a plurality of clusters; and
for each cluster of the plurality of clusters, determining that the cluster represents a human when a majority of vectors within the cluster have labels that correspond to a human and determining that the cluster represents a bot when a majority of vectors within the cluster have labels that correspond to a bot.

16. A security system, comprising one or more security server devices, server devices, or client devices, the security system comprising memory comprising programmed instructions stored thereon and one or more processors configured to be capable of executing the stored programmed instructions to:
receive a request for a webpage from a client device to a server device, the request associated with one or more associated logs;
generate, based on the received request and the one or more associated logs, a set of features representing the request, wherein the generated set of features has a smaller number of the features than features in the one or more associated logs;
input the set of features generated based on the received request and the one or more associated logs into a trained machine learning model; and
responsive to receiving an output of the trained machine learning model indicating the request for a webpage from the client device was initiated by a bot, deny the request to prevent an access to the server device by the client device.

17. The system of claim 16, wherein for the generate the set of features, the processors are further configured to be capable of executing the stored programmed instructions to:
extract raw text features from the one or more associated logs;
generate, based on the raw text features, numerical features and categorical features; and
generate, based on the numerical features and categorical features, a reduced number of features.

18. The system of claim 17, wherein for the generate a reduced set of features, the processors are further configured to be capable of executing the stored programmed instructions to:
convert the categorical features to numerical value features by using one hot encoding or utilizing a transformer to generate word embeddings;
generate a set of scaled features by applying feature scaling to the numerical features and numerical value features; and
input the set of scaled features to an autoencoder model that outputs the reduced set of features.

19. The system of claim 16, wherein the machine learning model comprises an ensemble model having an output that is determined by a majority vote, the ensemble model comprising one or more of:
a supervised machine learning model;
an unsupervised machine learning model; or
a semi-supervised machine learning model.

20. The system of claim 19, wherein the processors are further configured to be capable of executing the stored programmed instructions to train a first machine learning model of the ensemble model by:
applying a K-means clustering algorithm to a set of training data features represented by vectors to generate a plurality of clusters; and
for each cluster of the plurality of clusters, determining that the cluster represents a human when a majority of vectors within the cluster have labels that correspond to a human and determining that the cluster represents a bot when a majority of vectors within the cluster have labels that correspond to a bot.

\* \* \* \* \*